United States Patent
McDaniel et al.

[11] Patent Number: 6,034,208
[45] Date of Patent: *Mar. 7, 2000

[54] COPOLYMERS USEFUL AS CEMENT ADDITIVES AND A PROCESS FOR THEIR PREPARATION

[75] Inventors: Kenneth G. McDaniel, West Chester; Edward T. Shawl, Wallingford; Xinhau Zhou, West Chester, all of Pa.

[73] Assignee: Arco Chemical Technology, L.P., Greenville, Del.

[*] Notice: This patent is subject to a terminal disclaimer.

[21] Appl. No.: 09/074,673

[22] Filed: May 8, 1998

Related U.S. Application Data

[63] Continuation-in-part of application No. 08/918,081, Aug. 25, 1997.

[51] Int. Cl.⁷ .................................................. C08G 59/00
[52] U.S. Cl. ......................... 528/403; 528/405; 528/409; 528/417; 528/419; 528/421
[58] Field of Search .................. 528/403, 405, 528/409, 417, 419, 421

[56] References Cited

U.S. PATENT DOCUMENTS

| | | | |
|---|---|---|---|
| 3,829,505 | 8/1974 | Herold | 260/611 |
| 4,472,560 | 9/1984 | Kuyper et al. | 526/120 |
| 4,477,589 | 10/1984 | van der Hulst et al. | 502/169 |
| 4,808,641 | 2/1989 | Yagi et al. | 524/5 |
| 5,362,324 | 11/1994 | Cerulli et al. | 106/823 |
| 5,362,829 | 11/1994 | Kinoshita et al. | 526/240 |
| 5,470,813 | 11/1995 | Le-Khac | 502/175 |
| 5,482,908 | 1/1996 | Le-Khac | 502/154 |
| 5,545,601 | 8/1996 | Le-Khac | 502/156 |
| 5,660,626 | 8/1997 | Ohta et al. | 106/810 |
| 5,661,206 | 8/1997 | Tanaka et al. | 524/378 |
| 5,674,316 | 10/1997 | Izumi et al. | 106/724 |
| 5,707,445 | 1/1998 | Yamato et al. | 106/802 |
| 5,854,386 | 12/1998 | Shen et al. | 528/403 |

FOREIGN PATENT DOCUMENTS

| | | |
|---|---|---|
| 1337871 | 8/1989 | Canada . |
| 0 725 044 A1 | 10/1994 | European Pat. Off. . |
| 0 753 488 A3 | 6/1996 | European Pat. Off. . |
| 148957 | 1/1980 | Germany . |
| 1553584 | of 1990 | Japan . |
| H5-75252 | of 1991 | Japan . |
| H5-209052 | of 1993 | Japan . |
| WO 97/11132 | of 1997 | WIPO . |

*Primary Examiner*—Edward J. Cain
*Attorney, Agent, or Firm*—Stephen D. Harper

[57] ABSTRACT

Unique, well defined macromonomers containing hydroxyl-functionality, unsaturation-functionality, and polyoxyalkylene segments are prepared by oxyalkylating an unsaturated initiator molecule having at least one oxyalkylatable hydrogen in the presence of an effective amount of a double metal cyanide complex catalyst, optionally, when necessary, in the presence of a free radical polymerization inhibitor. The resulting unsaturated macromonomers are eminently suitable for such uses as copolymerization with ethylenically unsaturated monomers containing carboxylic acid-based groups such as acrylic acid to form effective superplasticizers and water reducers for cement and concrete applications.

18 Claims, No Drawings

COPOLYMERS USEFUL AS CEMENT ADDITIVES AND A PROCESS FOR THEIR PREPARATION

This is a continuation-in-part of application Ser. No. 08/918,081, filed Aug. 25, 1997.

FIELD OF THE INVENTION

The present invention relates to the field of cement additives. More particularly, the subject invention pertains to copolymers useful as water reducers and superplasticizers in concrete and cement compositions. The copolymers are prepared by a process which utilizes as one of the comonomers an unsaturated macromonomer obtained by oxyalkylation of an initiator molecule such as acrylic acid with an epoxide such as ethylene oxide and/or propylene oxide using a double metal cyanide complex catalyst. The unsaturated macromonomer is characterized by having not more than substantially one initiator molecule per molecule of reactive unsaturation-containing species and not more than about 0.020 meq/g unsaturation beyond that of initiator molecule-derived unsaturation. The macromonomers have a greatly reduced tendency to form gels during copolymerization as compared to conventionally prepared analogues, which contain significant levels of polyunsaturated species.

BACKGROUND OF THE INVENTION

Additives for cement to increase the fluidity of cement paste, mortars and concretes have been known and in use for many years. These additives are also known as water reducers because they allow less water to be used in a mortar or concrete without loss of slump (a measure of consistency or workability). This class of cement additives permits the use of less water to obtain the same slump, or the attainment of a higher slump at a given water content, or the use of less portland cement to realize the same compressive strength. The performance requirements for water reducing admixtures are specified in ASTM Method C494-92, "Standard Specifications for Chemical Admixtures for Concrete."

In ASTM C494-92, a water reducing admixture is defined as an admixture that reduces the quantity of mixing water required to produce concrete of a given consistency by at least 5%.

A high range water reducing admixture, also known as a superplasticizer, reduces the quantity of mixing water required to produce concrete of a given consistency by 12% or greater. Commercial water reducing admixtures include lignin sulfonates and naphthalene sulfonate-formaldehyde condensates. More recently, new classes of flow enhancers or water reducers have been described. U.S. Pat. No. 4,814,014 describes a cement composition containing a graft co-polymer containing a polymeric backbone moiety and polymeric side chain moieties wherein one of the polymeric moieties is a polyether moiety and the other is a non-polyether formed by polymerization of ethylenically unsaturated monomers. U.S. Pat. No. 4,808,641 describes a copolymer said to be useful for the purpose of increasing the flowability of fresh concrete which is prepared by copolymerizing (a) 10 to 95 parts by weight of a compound of general formula

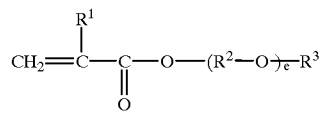

wherein $R^1$ is hydrogen or methyl, $R^2$ is a $C_2$–$C_4$ alkylene, $R^3$ is hydrogen or a $C_1$–$C_5$ alkyl and e is an integer of 1 to 100 and (b) 5 to 90 parts by weight of a compound of general formula

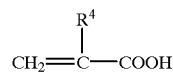

wherein $R^4$ is hydrogen or methyl or a salt thereof. Similar copolymers are also taught in Japanese Patent Publication (Kokoku) No. 59-18338/1984, U.S. Pat. Nos. 4,972,025, 5,661,206, 5,674,316, and 5,707,445. None of these patents provide any detailed description as to how one might synthesize the copolymer component corresponding to compound (a) above when $R^3$ is hydrogen (i.e., when the compound has a terminal hydroxyl group).

It would be desirable to prepare better defined reactive unsaturation-containing species which can be used to prepare a wide variety of copolymers useful as superplasticizers and water reducers in cementitious compositions.

SUMMARY OF THE INVENTION

It has now been surprisingly discovered that well defined reactive unsaturation-containing species may be prepared by oxyalkylating an oxyalkylatable molecule containing reactive unsaturation in the presence of a double metal cyanide complex catalyst. These reactive unsaturation-containing species may be utilized as macromonomers and copolymerized with one or more other monomers to form copolymers useful for controlling the fluidity of freshly mixed concrete.

DETAILED DESCRIPTION OF THE INVENTION

The subject invention process involves the oxyalkylation of a reactive-unsaturation-containing active hydrogen initiator molecule with one or more alkylene oxides in the presence of a double metal cyanide complex catalyst under conditions where no substantial addition polymerization involving the sites of unsaturation occurs. Suitable starter molecules are hydroxyalkylacrylates and methacrylates such as hydroxyethylacrylate, hydroxypropylacrylate, hydroxybutylacrylate, hydroxyethylmethacrylate and hydroxypropylmethacrylate and unsaturated monocarboxylic acids, particularly monounsaturated monocarboxylic acids and α-unsaturated acids such as acrylic acid and methacrylic acid. The molecular weight of the initiator molecule should be below 500 Da, and more particularly below 300 Da.

Preferably, the macromonomers obtained by oxyalkylation of the initiator molecule correspond to the formula

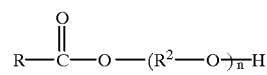

wherein n is an integer whose average value is from about 3 to about 500, more preferably about 5 to 100, $R^2$ is alkylene or substituted alkylene, i.e. $C_{2-30}$ alkylene optionally substituted by groups such as halo, i.e. fluoro, chloro, or bromo; alkoxy, i.e. methoxy, nitro; cyano, hydroxyalkyl, and the like, and R is a $C_{2-30}$ hydrocarbon containing at least one site of ethylenic or ethylynic (acetylenic) unsaturation, optionally substituted by non-reactive groups such as halo, alkoxy, cyano, and the like, and optionally containing interspersed heteroatoms, particularly O, S and/or N. R may be aliphatic, cycloaliphatic, aromatic, arylaliphatic, heteroaromatic, and the like, provided that when R is aromatic or heteroaromatic, the aromatic ring structure is substituted by at least one ethylenic or ethylynic radical-containing group. $R^2$ is most preferably ethylene ($C_2 H_4$), propylene ($C_3 H_6$), butylene ($C_4 H_8$) or some combination thereof.

The alkylene oxide employed in oxyalkylating the initiator molecule may be any alkylene oxide polymerizable with double metal cyanide catalysts. Examples include ethylene oxide, propylene oxide, 1,2- and 2,3-butylene oxide, $C_{6-30}$ α-olefin oxides, oxetane, glycidol, and halogenated alkylene oxides. Preferred are propylene oxide and ethylene oxide. Mixtures of more than one alkylene oxide may be used, for example, mixtures of propylene oxide and ethylene oxide. Alkylene oxides and their mixtures may be polymerized onto the initiator molecule in one or more stages, to produce homopolymers, block copolymers, random copolymers, block random copolymers, and the like. "Copolymer" in the present application includes "terpolymer" and mixtures of more than three alkylene oxides as well. Other comonomers may be polymerized along with the alkylene oxide. Examples of copolymerizable monomers include those disclosed in U.S. Pat. Nos. 3,278,457; 3,278,458; 3,404,109; 3,538,043; 3,900,518; 3,941,849; 4,472,560; 5,145,833; 5,145,883; and 5,223,583 which are herein incorporated by reference.

Suitable double metal cyanide catalysts are by now well known to those skilled in the art. Double metal cyanide complex catalysts are non-stoichiometric complexes of a low molecular weight organic complexing agent and optionally other complexing agents with a double metal cyanide salt, e.g. zinc hexacyanocobaltate. Exemplary double metal cyanide complex catalysts ("DMC catalysts") include those suitable for preparation of low unsaturation polyoxyalkylene polyether polyols as disclosed in U.S. Pat. Nos. 3,427,256; 3,427,334; 3,427,335; 3,829,505; 4,472,560; 4,477,589; and 5,158,922. Preferably however, the DMC catalysts used are those capable of preparing "ultra-low" unsaturation polyether polyols, particularly homopolyoxypropylene polyether polymers and polyoxypropylene/polyoxyethylene random polyether copolymer polyols. The polyoxyalkylene polymers produced by the catalysts typically have levels of unsaturation (other than the purposefully introduced unsaturation of the subject invention initiator molecules) less than about 0.010 meq/g as measured by ASTM D-2849-69, "TESTING OF URETHANE FOAM POLYOL RAW MATERIALS". Such catalysts are disclosed in U.S. Pat. Nos. 5,470,813 and 5,482,908, and 5,545,601, which are herein incorporated by reference. Preparation of the unsaturated macromonomers of the present invention is facilitated by such highly active catalysts under conditions where DMC catalysts of lesser activity are often inoperative or lead to addition polymerization of the unsaturated sites unless low oxyalkylation temperatures are used, often leading to gelling of the reactor.

Oxyalkylation conditions may be varied to suit the particular reactive unsaturation-containing initiator, alkylene oxide, and the like. For example, with liquid or low melting initiators, oxyalkylation may be effected by oxyalkylating neat, while with these same initiators or with solid initiators of higher melting point, oxyalkylation in solution or suspension in inert organic solvent may be desired. Suitable solvents include aprotic polar solvents such as dimethylsulfoxide, dimethylacetamide, N-methylpyrollidone, dimethylformamide, acetonitrile, methylene chloride, and especially the more volatile hydrocarbon solvents such as benzene, toluene, ethylbenzene, cyclohexane, petroleum ether, methylethylketone, cyclohexanone, diethylether, tetrahydrofuran, and the like. It has been found that certain difficultly soluble initiators may be initially oxyalkylated in suspension in an organic liquid such as toluene, and following oxyalkylation with from 1 to 4 mols of alkylene oxide, will form soluble reaction products which can be further oxyalkylated in solution.

Oxyalkylation temperatures and pressures when employing vinyl polymerization inhibitors are conventional. Temperatures may range from room temperature or below to c.a. 150° C. or higher. Preferably, temperatures in the range of 70° C. to 140° C. are used, more preferably about 90° C. to about 135° C. When highly active DMC catalysts capable of producing ultra-low unsaturation ($\leq 0.010$ meq/g) are used in the present process, it has been rather unexpectedly found that when the reaction is conducted at low temperatures, i.e. below 90° C., and most preferably in the range of 60–80° C., that polyoxyalkylation can occur at reasonable rates without addition polymerization of the unsaturated moieties present, even in the absence of a vinyl polymerization inhibitor. Alkylene oxide pressure is adjusted to maintain a suitable reaction rate, consistent with the ability of the process system to remove heat from the reactor. Pressures from 5 psig or lower to about 90 psig are useful. A pressure of 8–15 psig, preferably 10–12 psig when employing propylene oxide, ethylene oxide, or mixtures of these alkylene oxides may be advantageous.

Catalyst concentration is generally expressed as ppm based on the weight of the product. The amount of catalyst will depend upon the activity of the particular DMC catalyst. For catalysts of lower activity, such as those useful in preparing low unsaturation polyols, relatively large amounts of catalyst such as 250 ppm to 1000 ppm may be necessary to achieve a substantial reaction rate under the process conditions chosen. With very active catalysts such as those disclosed in U.S. Pat. Nos. 5,470,813, 5,482,908, and 5,545,601, amounts from less than 5 ppm to 250 ppm or higher are useful, more preferably from about 15 ppm to about 150 ppm.

In a typical synthetic procedure, the reaction is begun by introducing the reactive unsaturation-containing, oxyalkylatable initiator into a reaction vessel suitable for polyoxyalkylation, with or without a solvent or organic suspending agent. The catalyst is then introduced, either alone or in admixture with further solvent, suspending agent, or other diluent. The reactor is sealed, flushed with nitrogen, heated to the desired temperature, and alkylene oxide added until a pressure of c.a. 10 psig is reached. The reactor pressure is monitored until an initial pressure drop signifies that the "induction period" characteristic of DMC catalysts is over, and the catalyst has been activated. The induction period may be lessened by use of DMC catalysts suitable for preparing ultra-low unsaturation polyoxyalkylene polyols, and by the use of preactivated catalyst. Once the catalyst has been activated, alkylene oxide or oxides are added in admixture and/or in sequence to prepare a product of desired structure and molecular weight. Further details of the oxyalkylation, purification, etc., may be had with reference to the aforementioned U.S. patents, which are incorporated, for this and other purposes, by reference.

The oxyalkylation of the initiator may also take place with continuous addition of the initiator during the course of the reaction as disclosed in copending U.S. application Ser. No. 08/597,781 (corresponding to published PCT application WO97/00436), hereby incorporated by reference in its entirety. For example, the initiator or initiators may be fed to the reactor continuously, either dissolved in alkylene oxide, dissolved in inert diluent, or, with liquid initiators, neat. The continuous addition of the initiator(s) may also be accompanied by continuous removal of product, resulting in a continuous synthesis process, as disclosed in U.S. Pat. No. 5,689,012, also incorporated herein by reference in its entirety.

When performed at a temperature of about 90° C. or higher, the oxyalkylation of the reactive-unsaturation-containing molecule should be conducted in the presence of a vinyl polymerization inhibitor, preferably of the type which functions without the presence of oxygen, since oxyalkylations are generally conducted "in vacuo", meaning in this case that virtually the entire reactor pressure is due to alkylene oxide; or in the presence of a gas inert to the process, e.g. argon, nitrogen, etc. In other words, the partial pressure of oxygen generally is substantially zero. It is common to flush oxyalkylation reactors with nitrogen one or more times prior to final evacuation and introduction of alkylene oxide. Suitable inhibitors are well known to those skilled in the art of vinyl polymerization. Suitable inhibitors are, for example, 1,4-benzoquinone, 1,4-naphthoquinone, diphenylphenylhydrazine, $FeCl_3$, $CuCl_2$, sulfur, aniline, t-butylcatechol, trinitrobenzene, nitrobenzene, chloranil, and the like. Benzoquinone is preferred.

The inhibitor should be used in an amount effective to inhibit polymerization of the reactive unsaturation-containing initiator. Thus, the amount will vary with the reactivity of the particular type of unsaturation. Acrylates and methacrylates, for example, may require higher levels of inhibitor than less reactive unsaturation-containing initiators. The amount of inhibitor will also vary with oxyalkylation temperature, with higher temperatures requiring higher amounts of inhibitor. Amounts of inhibitor, in weight percent relative to the weight of the reactive-unsaturation-containing initiator, may vary from about 0.01 weight percent to about 5 weight percent, preferably from about 0.05 weight percent to about 1 weight percent, and more preferably from about 0.1 weight percent to about 0.5 weight percent. The latter range is particularly useful with 1,4-benzoquinone. If the vinyl polymerization inhibitor is not used, particularly with less active DMC catalysts, the product may be highly colored, or gelling of the product may occur.

By the term "well defined" as used herein in reference to the unsaturated macromonomer is meant a composition of relatively predictable composition at the molecular level in view of the initiator molecule used. For example, polyoxypropylation of a reactive-unsaturation-containing molecule with a single oxyalkylatable hydrogen should produce a polyoxypropylene polyether having a hydroxyl group at one terminus and the reactive unsaturation-containing initiator molecule at the opposite terminus. Relatively few or no other types of molecules are expected. The variation in oxyalkylation, e.g. the polydispersity, should increase somewhat with increasing molecular weight, but should be relatively low, in the range of 1.0 to 3.0, more preferably in the range of 1.0 to about 2.5, and most preferably in the range of 1.0 to 1.5.

The macromonomer product should contain less than 10 mol percent and preferably substantially no molecules containing two or more reactive unsaturation sites.

Well defined macromonomer products have hydroxyl functionalities close to that predicted based on the functionality of the initiator molecule. Singly oxyalkylatable initiators, for example, will result in macromonomers having very close to one hydroxyl group per molecule as actually measured. Specifically, for example, a macromonomer prepared by a process not in accord with the subject invention, for example by esterifying a mono-hydroxyl-reactive unsaturated moiety with either a conventional polyether polyol or with a DMC-catalyzed low unsaturation polyol, will not produce a well-defined product as that term is used herein. In a like vein, by the term "statistically similar" is meant, with respect to polyoxyalkylene polyether chains formed during preparation of the macromonomer, that the majority of such chains will be of similar length, with variations in length substantially that expected when preparing strictly hydroxyl functional polyoxyalkylene polyols employing DMC catalysts from similarly functional but saturated starter molecules.

Conventional oxyalkylation with alkylene oxides in the presence of basic catalysts cannot be used to prepare the unique reactive unsaturation-containing macromonomers of the subject invention. The base-catalyzed oxyalkylation will introduce a considerable quantity of allyl group-containing oligomers of broad molecular weight range. Moreover, the various reactants, partial reaction products, etc., will also interact in the presence of the strong base, to produce a variety of transesterifications and side reactions which would lead to a variety of ill-defined chemical linkages.

The unsaturated macromonomers of the subject invention are quantitatively different from those prepared by reaction of a hydroxyl-reactive, reactive unsaturation-containing monomer with a preformed polyether polyol. In particular, with monofunctional reactive unsaturation-containing initiators such as hydroxyethylmethacrylate, oxypropylation will yield a macromonomer which contains methacrylate functionality at one end of the molecule, and secondary hydroxyl at the other end. By contrast, reaction of methacrylic acid or isocyanatoethyl-methacrylate with a polyoxypropylene monol, e.g. polyoxypropylated n-butanol, will result in a methacrylate functional polyether with no hydroxyl functionality. Reaction of isocyanatoethylmethacrylate or methacrylic acid with a polyoxypropylene diol will result in a mixture containing both singly methacrylate-functional as well as doubly methacrylate-functional products. Unreacted polyoxypropylene diol may also be present. The products, again, will not be well defined. Moreover, such products will have an undesirable tendency to form gels when copolymerized with unsaturated comonomers such as acrylic acid due to the presence of doubly methacrylate-functional products capable of polymerization at each end of the molecule.

Following oxyalkylation, the macromonomer product may be vacuum stripped, for example using a stream of nitrogen, to remove unreacted monomers and other volatile components. The product may also be filtered to remove traces of DMC catalysts or their residues or may be subjected to other methods of catalyst removal. When DMC catalysts of the ultra-low unsaturation-producing type are employed, the small amounts of catalysts may be left in the product, or the product may be subjected to simple filtration.

The comonomer to be copolymerized with the unsaturated macromonomer is ethylenically unsaturated and contains at least one carboxylic acid-based group, which may be present in the form of a free carboxylic acid, a salt of a carboxylic acid, a hydroxyalkyl ester of a carboxylic acid, or an anhydride (preferably a cyclic anhydride). Mixtures of such comonomers may be utilized if so desired. Preferably, the structure of the comonomer corresponds to the formula

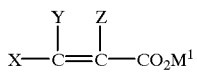

wherein X and Y are independently selected from hydrogen, a moiety represented by the formula $(CH_2)_m CO_2 M^2$, where m is an integer of 0 to 2, methyl, or X together with —$CO_2M^1$ form an anhydride ring, Z is selected from hydrogen or methyl and $M^1$ and $M^2$ are independently selected from hydrogen, alkali metal, alkaline earth metal, ammonium, alkyl ammonium, or hydroxyalkyl. Specific illustrative comonomers suitable for use in the present invention include, but are not limited to, maleic acid, fumaric acid, citraconic acid, maleic anhydride, hydroxyethylacrylate, hydroxypropylacrylate, hydroxyethylmethacrylate, hydroxypropylmethacrylate, citraconic anhydride, acrylic acid, methacrylic acid, and alkali metal, alkaline earth metal, ammonium, and alkyl ammonium salts of the aforementioned acids. Acrylic acid is particularly preferred.

The ratio of the unsaturated macromonomer to the comonomer is not believed to be particularly critical and may be readily varied as desired to optimize or otherwise modify the performance of the copolymer as a water reducer or superplasticizer in cement or concrete. The preferred ratio will depend upon a number of factors, including, for instance, the chemical compositions of the particular unsaturated macromonomer and comonomer(s) selected for use, the degree of oxyalkylation in the macromonomer and so forth. Typically, however, from 2 to 98% by weight of the macromonomer and from 2 to 98% by weight of the comonomer(s) (the total being 100%) may be utilized. Ethylenically unsaturated comonomers which do not contain the aforementioned carboxylic acid-based groups, such as, for example, vinyl aromatics (e.g., styrene), alkyl esters of unsaturated carboxylic acids (e.g., methyl methacrylate), unsaturated sulfonic acids and salts thereof (e.g., vinyl sulfonic acid) may also be incorporated in the copolymer. The overall composition of the copolymer should, however, be selected so as to render the copolymer (either in its acid form or its fully or partially neutralized form) soluble in water.

The number average molecular weight may also be controlled as may be desired to influence the performance of the copolymer as a cement additive. Chain transfer agents of the type conventionally used in free radical polymerization such as dodecylmercaptan or mercaptoacetic acid may be utilized for such purpose. Typically the chain transfer agent will be present at a concentration of from about 0.1 to about 5.0 weight percent based on the total weight of the feed to the reactor. Generally speaking, copolymer number average molecular weights of from about 1000 to 1,000,000 may be employed, with the range of from about 5,000 to 100,000 being especially preferred.

The copolymers of the present invention are prepared by combining the aforedescribed unsaturated macromonomer (or mixture of macromonomers) and one or more comonomers in a suitable solvent. A solvent is presently utilized if the macromonomer(s) and comonomer(s) are not miscible under the copolymerization conditions. The solvent to be used in the copolymerization may be any substance in which the macromonomer and other monomers are soluble, with the preferred solvents being water, lower aliphatic alcohols such as methanol, ethanol, isopropanol and the like and mixtures thereof. The copolymerization may also advantageously be carried out in the absence of a solvent. For example, acrylic acid is usually miscible with unsaturated macromonomers prepared using ethylene oxide as at least a portion of the alkylene oxide; the copolymerization of those materials thus can often be performed without solvent.

A vinyl polymerization initiator, e.g. an organic peroxide, hydroperoxide, hydrogen peroxide, persulfate, peroxyester, azo compound, or the like is added, and polymerization commenced. Examples of suitable free radical polymerization initiators include acyl peroxides such as didecanoyl peroxide and dilauroyl peroxide, alkyl peroxides such as t-butyl peroxy-2-ethylhexanoate, t-butylperpivalate, t-amyl peroctoate, 2,5-dimethyl-hexane-2,5-di-per-2-ethylhexoate, t-butylperneo-decanoate, t-butylperbenzoate and 1,1-dimethyl-3-hydroxybutylperoxy-2-ethylhexanoate, and azo catalysts such as azobis(isobutyronitrile), 2,2'-azo-bis-(2-methylbutyronitrile), and mixtures thereof. Most preferred are the acyl peroxides of the above formula, and the azo catalysts.

The polymerization initiator concentration employed is not critical and can be varied considerably. As a representative range, the concentration can vary from about 0.1 to about 5.0 weight percent or even more, based upon the total feed to the reactor. Up to a certain point, increases in the catalyst concentration result in increased monomer conversion, but further increases do not substantially increase conversion. The particular catalyst concentration selected will usually be an optimum value considering all factors, including costs.

The copolymerization temperature is not believed to be particularly critical, with the optimum temperature varying depending upon the identity and reactivity of the macromonomer and comonomer(s), the polymerization initiator and solvent, the molecular weight desired, and so forth. Typically, however, temperatures in the range of from about 0° C. to about 150° C. are suitable.

The copolymer preparation may be conduced in batch, semi-batch, and continuous processes. Following copolymerization, any relatively volatile unreacted monomers are generally stripped from the product.

Prior to using the copolymer as a cement additive, the free carboxylic acid groups and anhydride groups in the copolymer derived from the comonomer may be fully or partially converted to the salt form by conventional methods known in the art such as treatment with base (e.g., caustic) or the like (such methods being sometimes referred to as "neutralization" or "saponification").

The cements with which the copolymer additives of the invention may be used are hydraulic cements, meaning cements which, when made into a paste with water, set and harden as a result of chemical reactions between the water and cement. Suitable cements include ordinary, quick-hardening, and moderate-heat portland cements, alumina cement, blast-furnace slag cement, and flash cement. Of these, portland cements of the ordinary and quick-hardening types are particularly desirable.

The quantity of copolymer additive used may vary with factors such as the degree of oxyalkylation of the unsaturated macromonomer, the type(s) of alkylene oxide selected for use, the molecular weight of the copolymer, and the identity and relative proportions of the comonomer and the unsaturated macromonomer. The additive quantity to be used in accordance with the invention is usually in the range of 0.001–10%, preferably 0.01 to 1%, based on the weight of dry cement. The quantity of water to be used for setting the cement is not critical; generally weight ratios of water to cement in the range 0.25:1 to 0.7:1, preferably 0.3:1 to 0.5:1 are satisfactory. Where desired, an aggregate such as pebbles, gravel, sand, pumice, or fired pearlite or mixtures thereof may be employed in conventional amounts.

Advantageously, the copolymer additives of this invention, which function as water reducing agents and/or superplasticizers, are used in combination with other known cement additives.

Among the optionally employable additional additives are: conventional hardening accelerators, e.g., metal chlorides such as calcium chloride and sodium chloride, metal sulfates, such as sodium sulfate, and organic amines such as triethanol-amine; ordinary hardening retarders, e.g. alcohols, sugars, starch and cellulose; reinforcing-steel corrosion inhibitors such as sodium nitrate and calcium nitrite; other water reducing agents such as ligninsulfonic acid salts, as well as salts of oxycarboxylic acid and formalin condensates of naphthalenesulfonic acid; air entrainers; other super plasticizers; shrinkage reducing agents; strength enhancers such as triisopropylamine; antifoaming agents such as tributyl phosphate; fibers such as polypropylene fibers and the like. The quantity of such an optional ingredient or ingredients is usually 0.1–6% by weight of the cement.

The manner of adding the copolymer additive of the invention to the cement may be the same as with ordinary cement admixtures. For example, the copolymer additive can be admixed with a suitable proportion of water and the resulting solution is mixed with cement and aggregate. As an alternative, a suitable amount of the copolymer additive may be added when cement, aggregate and water are mixed. Another method of introducing the additive is to add it to the dry cement prior to or after grinding.

The concrete and the like incorporating the copolymer additive according to the invention may be applied in conventional ways. For example, it may be trowelled, filled in forms, applied by spraying, or injected by means of a caulking gun. Hardening or curing of the concrete and the like may be by any of the air drying, wet air, water and assisted (steam, autoclave, etc.) curing techniques. If desired, two or more such techniques may be combined. The respective curing conditions may be the same as in the past.

EXAMPLE 1

This example illustrates the preparation of an unsaturated macromonomer useful for making the copolymers of the invention. A one-liter stirred reactor is charged with 105.8 g hydroxypropylmethacrylate, 0.1485 g of a DMC catalyst prepared as disclosed in U.S. Pat. No. 5,545,601, and 0.42 g benzoquinone. The mixture is heated to 100° C. with stirring, evacuated, and propylene oxide (29 g) fed to the reactor. The initial pressure of the reactor is 12 psig. After 20 minutes, the reactor pressure drops to −1.0 psig and additional propylene oxide is fed continuously at 6.5 g/min until a total of 645 g has been added. The reactor temperature is maintained at 100° C. throughout this process. After propylene oxide addition is complete, the mixture is held at 100° C. until a constant pressure is observed. Residual unreacted monomer is then stripped under vacuum at 80° C. from the product. The resulting product (725 g) is very slightly yellow with a low viscosity of 134 cps (25° C.). It has a hydroxyl number of 56.6 mg KOH/g and an unsaturation of 0.0092 meq/g. GPC gives a number average weight of 1037 and a polydispersity (Mw/Mn) of 1.04. NMR shows it contains substantially 15 PO units per methacrylate unit. The proposed structure is consistent with NMR and IR results.

COMPARATIVE EXAMPLE C1

A procedure similar to that disclosed by Japanese Kokai H5-209052 (1993) is used in an attempt to prepare a c.a. 1000 Da molecular weight product, except that a low molecular weight starter is used instead of a much higher weight polyoxypropylated oligomeric starter. To a one liter stirred reactor is added 70 g hydroxypropylmethacrylate and 0.269 g of a t-butanol complexed double metal cyanide catalyst prepared as disclosed in U.S. Pat. No. 5,470,813. In contradistinction to the subject invention, no vinyl polymerization inhibitor is added. The reaction mixture is vacuum stripped with nitrogen flushing for eight minutes, and the reactor heated to 130° while stirring. Propylene oxide in the amount of 14 g is fed to the reactor, and the reactor pressure reaches 7.8 psig. After 7 minutes, the catalyst is observed to be activated due to an observed pressure drop, and significant exothermic reaction is observed. Propylene oxide is then fed to the reactor at a rate of 3.0 g/min until a total of 430 g is added. The mixture is then held at 130° C. until constant pressure is observed. Residual unreacted propylene oxide is stripped under vacuum at 130° C. The product has a viscosity of 2820 cps at 25° C. despite having a molecular weight of only about 1000 Da. The viscosity may be compared to the very similar product of the preceding example which had a viscosity of only 134 cps, less than one-twentieth the viscosity of the comparative product. However, the material hardens in the collecting bottle and no further analysis is performed.

EXAMPLE 2

A one-liter stirred reactor is charged with 136.4 g product from Example 1, 0.02 g DMC catalyst, and 0.40 g benzoquinone. The mixture is heated to 100° C. with stirring, and stripped under vacuum with nitrogen sparging. After stripping, propylene oxide (25 g) is fed to the reactor. The initial pressure of the reactor is 16 psig. After 22 minutes, the reactor pressure drops to 0.7 psig and additional propylene oxide is fed to the reactor continuously at 6.5 g/min until a total of 131 g has been added. The reaction mixture is then cooked to constant pressure. To the reactor, 28 g acetonitrile is added and PO feeding to the reactor continued at a rate of 6.5 g/min to a total of 660 g. The reactor temperature is maintained at 100° C. throughout this process. After propylene oxide addition is complete, the mixture is held at 100° C. until a constant pressure is observed. Residual unreacted monomer and acetonitrile are then stripped under vacuum at 60° C. from the product. The resulting product, in the amount of 7540 g, has a viscosity of 4,010 cps (25° C.), a hydroxyl number of 10.4 mg KOH/g, and an unsaturation of 0.0044 meq/g. GPC gives a number average molecular weight of 6933 and a polydispersity (Mw/Mn) of 1.26, despite the high molecular weight. NMR shows it contains substantially 92 PO units per methacrylate unit. The proposed structure is consistent with NMR and IR results.

EXAMPLE 3

A one-liter stirred reactor is charged with 100 g product from Example 1, 0.04 g DMC catalyst, 0.3 g benzoquinone and 200 g toluene. The mixture is heated to 100° C. with stirring. Propylene oxide (39 g) is fed to the reactor. The initial pressure of the reactor is 15 psig. After 17 minutes, the reactor pressure drops to 1.4 psig and additional propylene oxide is fed to the reactor continuously at 4 g/min to a total of 100 g. Then, the reaction temperature is increased to 130° C. while PO feeding is maintained at 4 g/min throughout this temperature ramping. After a total of 500 g propylene oxide is added, the mixture is held at 130° C. until a constant pressure is observed. Residual unreacted monomer and toluene are then stripped under vacuum at 60° C. from the product. The resulting product, in the amount of 737 g, has a viscosity of 925 cps (25° C.), and contains 12% of toluene. It has a hydroxyl number of 8.4 mg KOH/g and an unsaturation of 0.0073 meq/g. GPC gives a number average weight of 4853 and a polydispersity (Mw/Mn) of 2.43. The proposed structure is consistent with NMR and IR results.

EXAMPLE 4

This example demonstrates the preparation of an unsaturated macromonomer where hydroxypropylacrylate is used as the initiator molecule and a mixture of propylene oxide and ethylene oxide (50/50 molar ratio) is used during oxyalkylation. A 2 gallon stirred reactor was charged with 100 g hydroxypropylacrylate, 0.57 g of DMC catalyst (prepared as described in U.S. Pat. No. 5,545,601), 700 g toluene and 0.50 g benzoquinone. The mixture was stripped under vacuum with nitrogen sparging at room temperature for 15 minutes. The mixture was then heated to 130° C. while being stirred. Propylene oxide (containing 20.2% hydroxypropylacrylate) was then fed to the reactor at 14.3 g/min to a total of 2725 g while ethylene oxide was being fed to the reactor at 12 g/min to a total of 2175 g. The reactor temperature was maintained at 130° C. during the addition of the alkylene oxides. Once alkylene oxide addition was completed, the mixture was held at 130° C. until a constant pressure was observed. Residual unreacted alkylene oxide and toluene were then stripped under vacuum at 130° C. from the reaction product. The unsaturated macromonomer thus obtained had a hydroxy number of 56.3 mg KOH/g. Gel permeation chromatography confirmed that the macromonomer had a number average molecular weight of 1073 and a polydispersity (Mw/Mn) of 1.38. NMR and IR analyses confirmed that the product had the desired well-defined structure.

EXAMPLE 5

This example demonstrates the preparation of an unsaturated macromonomer where hydroxypropylacrylate is used as the initiator molecule and a 70/30 molar ratio of ethylene oxide and propylene oxide is utilized during oxyalkylation.

A 2 gallon stirred reactor was charged with 130 g hydroxypropylacrylate, 0.8 g DMC catalyst (prepared as described in U.S. Pat. No. 5,545,601), 0.5 g benzoquinone, 4 g BHT and 700 g toluene. The reaction mixture is stripped at room temperature for 15 minutes to remove oxygen and then heated with stirring to 130° C. Propylene oxide (120 g) was then fed to the reactor. The pressure within the reactor was initially 20 psig, but dropped to 12.8 psig after 2 minutes. Additional propylene oxide was fed to the reactor continuously at 6.5 g/min to a total of 1161 g and at the same time ethylene oxide was fed to the reactor continuously at 15 g/min to a total of 2709 g. After addition was completed, the reaction mixture was held at 130° C. until a constant pressure was observed. Residual unreacted alkylene oxide and toluene were then stripped under vacuum at 130° C. from the product. The product (3990 g) had a viscosity of 2745 cps and had a structure, according to NMR and IR analyses, consistent with that of the desired well defined unsaturated macromonomer.

EXAMPLE 6

This example demonstrates the synthesis of an unsaturated macromonomer prepared using hydroxypropylmethacrylate as the initiator molecule and a 50/50 molar ratio of ethylene oxide and propylene oxide.

A one liter stirred reactor was charged with 230.7 g hydroxypropylmethacrylate, 0.5 g DMC catalyst (prepared in accordance with U.S. Pat. No. 5,545,601), 0.6 g benzoquinone, and 0.4 g BHT. The mixture was vacuum stripped at 100° C. for 5 minutes to remove oxygen before introducing 40 g propylene oxide. The pressure within the reactor was initially 23 psia, but dropped to 1.3 psia after 8 minutes. Additional propylene oxide was fed to the reactor continuously at 2.5 g/min to a total of 285 g and at the same time ethylene oxide was fed to the reactor continuously at 2.5 g/min to a total of 252 g. After addition was completed, the reaction mixture was held at 100° C. until a constant pressure was observed. Residual unreacted alkylene oxide and toluene were then stripped from the product under vacuum at 100° C. The resulting product (766 g) had a viscosity of 46 cps, a number average molecular weight (by GPC) of 552, and a polydispersity of 1.13. NMR and IR analysis confirmed the product had the desired well-defined unsaturated macromonomer structure.

EXAMPLE 7

This example demonstrates the copolymerization of an unsaturated macromonomer prepared using the procedure described in Example 4 where hydroxypropylacrylate is the initiator molecule, the macromonomer number average molecular weight is about 2000, and a 50/50 wt/wt mixture of ethylene oxide and propylene oxide is employed to oxyalkylate the initiator molecule. A mixture consisting of 80 g (0.04 equiv.) unsaturated macromonomer, 16.7 g (0.23 mol) acrylic acid, 0.97 g azobis(isobutyronitrile) and 0.76 g mercaptoacetic acid was charged to a 250 mL round bottom flask equipped with a mechanical stirrer, condenser and thermocontroller. The mixture was heated for 60 min at 85° C. The resulting copolymer was a clear, viscous liquid having a number average molecular weight of 10,000 and a weight average molecular weight of 35,000. The copolymer is expected to have utility as a water reducer and/or superplasticizer in cement, concrete and mortar compositions.

EXAMPLE 8

Water (60 g) was charged to a 250 mL round bottom flask and heated to 70° C. A mixture containing 61.2 g (0.061 equiv.) unsaturated macromonomer, 21.8 g (0.30 mol) acrylic acid, 0.77 g azobis(isobutyronitrile), and 1.78 g mercaptoacetic acid was added dropwise to the flask over 140 minutes. The unsaturated macromonomer had been prepared in accordance with the procedures of Example 4 using a 50/50 wt/wt mixture of ethylene oxide and propylene oxide to oxyalkylate the initiator molecule to a number average molecular weight of about 1000. At the end of the addition, the mixture was heated to 85° C. for 30 minutes. The resulting water-soluble copolymer had a number average molecular weight of 4700 and a weight average molecular weight of 14,600 and may be utilized to increase the fluidity of a freshly mixed cement or concrete composition.

EXAMPLE 9

An unsaturated macromonomer was prepared in accordance with the procedures of Example 6 using hydroxypropylmethacrylate as the initiator molecule and a 50/50 wt/wt mixture of ethylene oxide and propylene oxide to oxyalkylate the hydroxypropylmethacrylate to a number average molecular weight of about 500. The unsaturated macromonomer (40 g; 0.08 equiv.) was dissolved in 60 g water and mixed with 4.92 g (0.068 mol) acrylic acid, 0.59 g azobis(isobutyronitrile), and 1.11 g mercaptoacetic acid. The mixture was heated for 30 minutes at 70° C. The resulting copolymer had a number average molecular weight of 3300, a weight average molecular weight of 21,000, and may be used as a water reducer additive in cement, concrete or mortar compositions.

EXAMPLE C2 (COMPARATIVE)

A commercial sample of a polyether acrylate made by esterification of acrylic acid with a 400 molecular weight poly(ethylene glycol) was obtained. The polyether acrylate was comprised of about 80% of the mono-acrylate ester and about 20% of the diacrylate ester of the poly(ethylene glycol). A solution of 70 g (0.15 equiv.) of the polyether acrylate, 25.0 g (0.35 mol) acrylic acid, 1.35 g azobis (isobutyronitrile), and 1.35 g mercaptoacetic acid were added dropwise to 40 g water at 85° C. After 10 minutes, the reaction mixture gelled. The copolymerization was repeated at 60° C. with all the reaction components mixed initially in the reactor. This product also gelled and could not be further used.

We claim:

1. A copolymer useful as a cement additive obtained by
   (a) oxyalkylating an initiator molecule selected from the group consisting of hydroxyalkyl acrylates, hydroxyalkyl methacrylates, and monounsaturated monocarboxylic acids with an alkylene oxide in the presence of an effective amount of a double metal cyanide complex catalyst under conditions effective to form a well-defined unsaturated macromonomer having a terminal hydroxyl functionality and not more than substantially one initiator molecule per unsaturated macromonomer molecule; and
   (b) copolymerizing the unsaturated macromonomer with at least one comonomer which is ethylenically unsaturated and has at least one carboxylic acid-based group selected from free carboxylic acids, carboxylic acid salts, hydroxyalkyl esters of carboxylic acids, and carboxylic acid anhydrides.

2. The copolymer of claim 1 wherein the comonomer is represented by the following formula

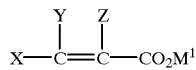

wherein X and Y are the same or different and are selected from hydrogen, methyl, or a moiety represented by the formula $(-CH_2)_m CO_2 M^2$ where m is an integer of 0 to 2, or X together with $-CO_2 M^1$ forms an anhydride ring, Z is selected from hydrogen or methyl and $M^1$ and $M^2$ are the same or different and are independently selected from hydrogen, alkali metal, alkaline earth metal, ammonium, alkyl ammonium or hydroxyalkyl.

3. The copolymer of claim 1 wherein the initiator molecule is selected from the group consisting of acrylic acid, methacrylic acid, hydroxypropyl methacrylate, hydroxyethyl methacrylate, hydroxypropyl acrylate and hydroxyethyl acrylate.

4. The copolymer of claim 1 wherein the unsaturated macromonomer corresponds to the formula

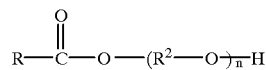

wherein n is an integer whose average value is from about 5 to 100, $R^2$ is alkylene or substituted alkylene, and R is a $C_2$–$C_{30}$ hydrocarbon containing one site of ethylenic unsaturation.

5. The copolymer of claim 1 wherein the comonomer is selected from the group consisting of acrylic acid, methacrylic acid, maleic acid, fumaric acid, and salts and mixtures thereof.

6. The copolymer of claim 1 wherein the alkylene oxide is selected from the group consisting of ethylene oxide, propylene oxide, and mixtures thereof.

7. The copolymer of claim 1 wherein the unsaturated macromonomer has a polydispersity in the range of 1.0 to 1.5.

8. The copolymer of claim 1 wherein the unsaturated macromonomer has not more than about 0.020 meq/g unsaturation beyond that of initiator molecule-derived unsaturation.

9. The copolymer of claim 1 having a number average molecular weight of from 5,000 to 100,000.

10. The copolymer of claim 1 wherein $R^2$ is selected from the group consisting of ethylene, propylene, butylene and combinations thereof.

11. A process for preparing a copolymer useful as a cement additive comprising the steps of
    (a) oxyalkylating an initiator molecule selected from the group consisting of hydroxyalkyl acrylates, hydroxyalkyl methacrylates, and monounsaturated monocarboxylic acids with an alkylene oxide in the presence of a double metal cyanide complex catalyst under conditions effective to form a well-defined unsaturated macromonomer having a terminal hydroxyl functionality and not more than substantially one initiator molecule per unsaturated macromonomer molecule; and
    (b) copolymerizing the well-defined unsaturated macromonomer with at least one comonomer which is ethylenically unsaturated and has at least one carboxylic acid-based group selected from free carboxylic acids, carboxylic acid salts, hydroxyalkylesters of carboxylic acids, and carboxylic acid anhydrides.

12. The process of claim 11 where step (a) is performed in the presence of one or more vinyl polymerization inhibitors.

13. The process of claim 12 wherein step (a) is performed at a temperature in the range of 70° C. to 150° C.

14. The process of claim 12 wherein said vinyl polymerization inhibitor is one which functions in the absence of oxygen.

15. The process of claim 11 wherein the alkylene oxide is selected from the group consisting of ethylene oxide, propylene oxide, and mixtures thereof.

16. A cement composition comprised of cement and from 0.001 to 10% by weight based on the weight of cement of a copolymer prepared in accordance with claim 11.

17. A concrete composition comprised of cement, aggregate and from 0.001% to 10% by weight based on the weight of cement, of a copolymer prepared in accordance with claim 11.

18. A method of increasing the fluidity of a hydraulic cement composition comprising adding from 0.001 to 10 percent by weight based on the weight of dry cement of a copolymer prepared in accordance with claim 11 to the hydraulic cement composition.

* * * * *